March 21, 1967  S. T. CARTER  3,310,151
ARTICLE COMBINER

Original Filed Dec. 3, 1963  5 Sheets-Sheet 1

INVENTOR.
Sidney T. Carter
BY
Roberts Cushman & Grover
ATTORNEYS

United States Patent Office 3,310,151
Patented Mar. 21, 1967

1

3,310,151
ARTICLE COMBINER
Sidney T. Carter, Shrewsbury, Mass., assignor to Geo. J. Meyer Manufacturing Co., Cudahy, Wis., a corporation of Wisconsin
Continuation of application Ser. No. 327,668, Dec. 3, 1963. This application Apr. 8, 1966, Ser. No. 541,391
8 Claims. (Cl. 198—32)

This application is a continuation of Serial No. 327,-668, filed Dec. 3, 1963, now abandoned.

This invention pertains to article-combining apparatus, that is to say, to means operative automatically to arrange discrete articles, for instance containers, such as cans or bottles, in tandem relation to form a single row (usually rectilinear), and relates more especially to apparatus comprising conveying means which normally advances articles uninterruptedly, as received from a supply, either in a disorderly mass or in two or more definite rows; a delivery conveyor of a width such as to accommodate but a single row of articles disposed in tandem relation; and means operative to arrange the articles, advanced by the receiving conveyor, in a single row while transferring them to the delivery conveyor, the invention relating more especially to means operative to prevent the jamming of articles in the process of arranging them in a single row. Customarily, in so combining articles to form a single row, the articles are delivered into a supply chamber or combining area of a width such that the articles are more or less free to move transversely as they are advanced through this chamber by conveyor means and from this combining chamber a converging passage leads to the entrance to the delivery conveyor, the width of the converging passage at its discharge end, where it joins the delivery conveyor, being just sufficient to permit one article at a time to pass. It is in this converging passage that jams of articles occur. Although when dealing with containers which are of substantially uniform shape, such a jam may occur but infrequently, it does occur when two articles for example bottles, fortuitously arrive at a position in the passage where a line, passing through the centers of both of the bottles, is substantially perpendicular to one wall, at least, of the passage while the articles are in contact with each other. Under such conditions each bottle opposes the further advance of the other with the result that a jam is formed, blocking the passage and thus necessitating the shutting down of the combining apparatus to permit the jam to be broken, usually manually, and consequently stopping the effective operation of the processing machine to which the articles are to be delivered thus cutting down production.

Various suggestions have been made for preventing the occurrence of such a jam or for breaking the jam automatically if it occur, for example, by the provision of power-driven vibrating means for shaking the articles or for oscillating one wall of the passage or, for example, temporarily reversing the direction of motion of the conveyor means with the idea of disengaging the jammed articles from the walls of the combining chamber. While some such arrangements are reasonably effective, they usually require the expenditure of power and involve complication of parts and, in many instances, complex electrical circuitry.

It has been discovered with respect to circular articles, such as bottles or cans, that if, in the converging passage leading to the delivery conveyor, three such articles are so relatively arranged that their center points define the corners of an equilateral triangle, with two of the articles contacting one wall and the third article contacting the other wall of the passage, and with said third article contacting the other two articles, no jam will occur so

2 long as articles, in sufficient quantity are supplied, without interruption, to the combining area after such a triangular relation has once been established, for example manually. This discovery offers a simple solution of the problem of preventing a jam, but its effectiveness is dependently entirely upon the maintenance, in the combining chamber, of a supply of articles such that, as the articles forming the original triangular relation move on into the delivery passage, others are always ready automatically to take their place.

However, assuming that the articles, after having been arranged in a single row, are being delivered to a processing apparatus which takes the articles from the delivery conveyor as fast as they are fed into the delivery path, if for any reason the supply of articles to the combining chamber be temporarily stopped or slowed down while the processing machine continues to operate, the triangular formation of articles in the convering passage will be broken immediately the supply of articles to the combining chamber is reduced below normal and thus the apparatus is no longer immune to the possibility of the formation of a jam.

The present invention has for its object the provision of simple but effective means whereby the above discovery may be taken advantage of and without substantial danger that its effectivness will be terminated because of a lessening of the normal quantity of articles in the supply or combining chamber. In the attainment of this object the present invention contemplates the provision of detector means within the supply or combining chamber, so related to the means for driving the processing apparatus, or to the single-row conveyor means, that if the normal supply of articles to the combining chamber is reduced or ceases, after the non-jamming or triangular relation of articles has once been established in the converging passage, the withdrawal of articles from the combining chamber or area will immediately cease, so that the antijamming pattern in the converging passage remains intact until articles are again supplied to the combining chamber in sufficient quantity to actuate the detector device and thus permit the processing apparatus or single-row conveyor means to resume operation.

Other objects and advantages of the invention will be pointed out in the following more detailed description and by reference to the accompanying drawings wherein.

Figure 1:
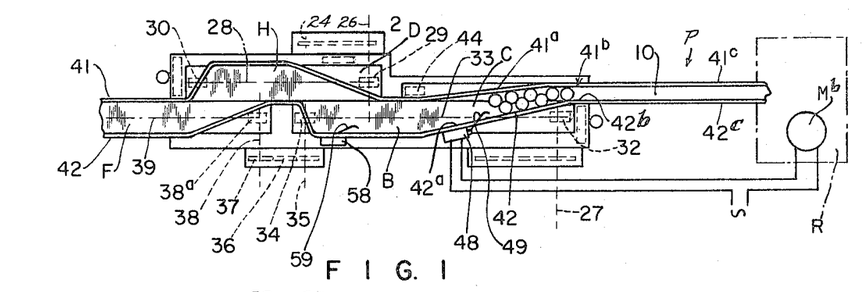
FIG. 1 is a diagrammatic plan view of combining apparatus embodying the present invention and wherein the combining apparatus is arranged to arrange articles in tandem relation in a single row delivery path.
Figure 2:
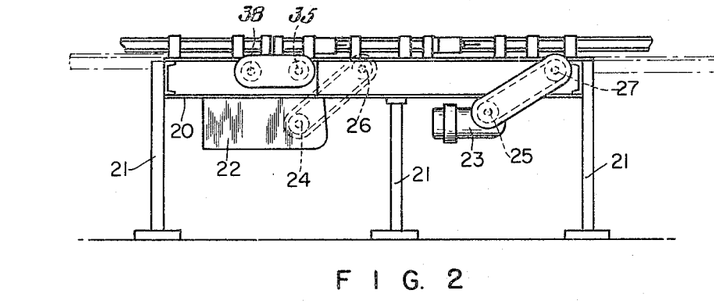
FIG. 2 is a diagrammatic side elevation of the apparatus of FIG. 1.

Referring to FIGS. 1 and 2, the combining apparatus, according to the present invention, is shown as designed to deliver all articles which it receives into a single-row conveyor path. This "path" may simply comprise a smooth, stationary floor (horizontal or inclined) and parallel walls spaced apart a distance slightly exceeding the diameter of the article to be handled, along which the articles may be pushed or moved by gravity, or, the floor may be movable in a direction to advance the articles along the path, for example an endless belt driven, for instance, by an independent motor or by connections from the apparatus to which the articles are to be delivered. This "path," as thus defined, constrains the articles which move along it to move in tandem relation, that is to say, in single file, and for convenience herein will be referred to as the "delivery path" or "delivery conveyor." As here illustrated, the floor of this path is an endless belt 10 having a substantially horizontal article-supporting run. The delivery path, in accordance with the invention, will lead to a receiver R which might, for example, be a simple receptacle into which the articles may be delivered, or a moving conveyor operative to carry the articles away as fast as they are delivered to it, or it may be some apparatus for operating upon the articles and which will hereinafter be referred to as "processing apparatus," for specific example a "labeling machine."

Referring to FIG. 2 the combining apparatus, embodying the present invention, is shown as comprising a rigid frame 20 supported by suitable legs 21 and to which motor housing 22 and 23, respectively, are attached, these housings encasing electric motors $M^1$ and $M^2$ (not shown), whose shafts are indicated at 24 and 25 respectively. The frame also has bearings for shafts for supporting and driving the several endless conveyors comprised in the apparatus. One of these shafts, designated by the numeral 26, is driven by the motor $M^1$ in the housing 22 by means of suitable sprockets and chains, while a second one of these shafts, designated by the numeral 27, is driven by the motor $M^2$ in the housing 23 by means of appropriate sprockets and chains.

An endles chain 28 (FIG. 1), embracing a sprocket 29 on the shaft 26 and an idler socket 30, constitutes the driving element for an endless conveyor D. Likewise a sprocket 32 on the shaft 27, which is driven by the motor $M^2$ in the housing 23, is embraced by an endless chain 33 which also embraces a sprocket 34 fixed to a shaft 35, said chain constituting the drive element for a conveyor B. An endless chain 36 embraces another sprocket fixed to the shaft 35 and also a sprocket 37 on a shaft 38 mounted in bearings in the machine frame and which carries a sprocket 38a about which is entrained an endless chain 39 which forms the driving element for an endless conveyor F. With this arrangement the motor $M^2$, which is within the housing 23 (this motor being a constant-speed, unidirectional motor) not only drives the conveyor B but also the conveyor F. However, it is contemplated that the conveyor F may be driven by an independent motor if so desired. The motor $M^1$ within the housing 22 is a variable-speed motor of conventional type whose speed may be adjusted by manual control. This motor, as above described, drives the shaft 26 and conveyor D.

For convenience in description, it will be assumed, merely by way of example, that the conveyor F, which is hereafter referred to as a "supply conveyor" is of a width (between the spaced parallel guide walls 41 and 42) to permit two bottles to move abreast, that is to say, in two parallel rows and that a spacing of the walls 41 and 42 of 7½ inches is sufficient to accommodate two such parallel rows of articles of a selected size.

This conveyor F discharges bottles carried thereby into a space H (FIG. 1), hereinafter referred to as the "combining area" or supply chamber, whose floor is constituted by portions of the article-supporting runs of the conveyors F, D and B, and which, as above pointed out, is of such transverse dimensions that the articles therein are able to move about transversely while passing therethrough, while its boundaries are defined by extensions of the walls 41 and 42, desirably so arranged as to deflect all articles carried by the conveyor F transversely onto the conveyor D from which they are then transferred transversely and in no particular order to the conveyor B. The spaced, article-confining side-walls 41 and 42 have continuations 41a and 42a which at first are spaced apart a width substantially equal to the width of the conveyor B (whose width is desirably equal to that of the supply conveyor F) and then gradually converge until at 41b and 42b they are spaced apart a distance defining the entrance to a delivery path P whose width is such as to accommodate but a single row of articles arranged in tandem relation. The space C between the walls 41a and 42a which thus decreases in width toward its delivery end is hereinafter for convenience referred to as the "Convergent Passage," this being the space within which the articles, under normal conditions, arrange themselves so as to enter the single-row delivery path P in tandem relation without jamming as they move along the constantly narrowing passage C.

The delivery path P, along which the articles pass in a single row from the smaller end of the passage C to the point of discharge, for example a processing apparatus R, has a floor, as herein illustrated, constituted by the upper run of the endless belt conveyor 10 which is entrained about an idler sprocket 44 supported by the frame, and may be driven by an independent motor (not here shown), or by connections from the motor-driven processing apparatus R, the side walls 41c and 42c of this delivery path P being spaced apart just sufficiently to permit a single row of articles, disposed in tandem relation, to move along the delivery path.

The flow of articles along the delivery path P may be temporarily stopped in various ways. For example, if the conveyor 10 is driven by an independent electric motor, the discharge of articles from the converging passage C into the entrance to the delivery path P may be terminated by stopping the motor which drives the conveyor 10. Alternatively, the flow of articles along the delivery path P may be stopped by stopping the drive motor for the processing apparatus R. Again, as illustrated diagrammatically in FIG. 12, one of the side walls, for example the wall 41c, which define the delivery path, may be provided with a movable section 45 whose inner surface is normally aligned with the inner surface of adjacent portions of the wall 41c, but which may be moved inwardly a short distance, just sufficient to block the passage of articles along the delivery path. For example, this movable section 45 may be supported and guided by a slidable stem 46 to which the core of a solenoid N is secured, the coils of the solenoid normally be energized whereby the stem is kept in a position such that the inner surface of the part 45 is flush with the inner surface of the wall 41c. However, as by means of a spring 47, the part 45 is moved inwardly to block the delivery passage upon the de-energization of the solenoid N which may be the result of opening a switch in the supply circuit for the solenoid. This switch, for example, may be that which is illustrated diagrammatically at $S^1$ in FIG. 12, this switch constituting an element of a detector device 48 (FIG. 1) mounted on the wall 42a of the convergent passage C and having a movable detector or feeler finger 49 which extends through an opening in said wall into the converging passage C. Normally this detector finger extends widthwise of the passage a predetermined distance which may be varied by adjusting the detector device, as a whole, toward or from the narrower part of the passage C. When properly adjusted, the presence of a certain quantity of bottles wtihin the passage C will result in a sufficient pressure upon the detector finger 49 to keep the switch $S^1$ closed and the solenoid N energized, so keeping the part 45 in inoperative position. However, if for any reason the quantity of articles within the passage C decrease so much that the detector finger 49 may move further inwardly toward the center of the passage, the switch $S^1$ is thereby opened, the circuit of the solenoid is de-energized, and the part 45 instantly moves far enough into the delivery passage to stop further discharge of articles from the delivery portion of the converging passage C.

Figures 8, 12, 13:
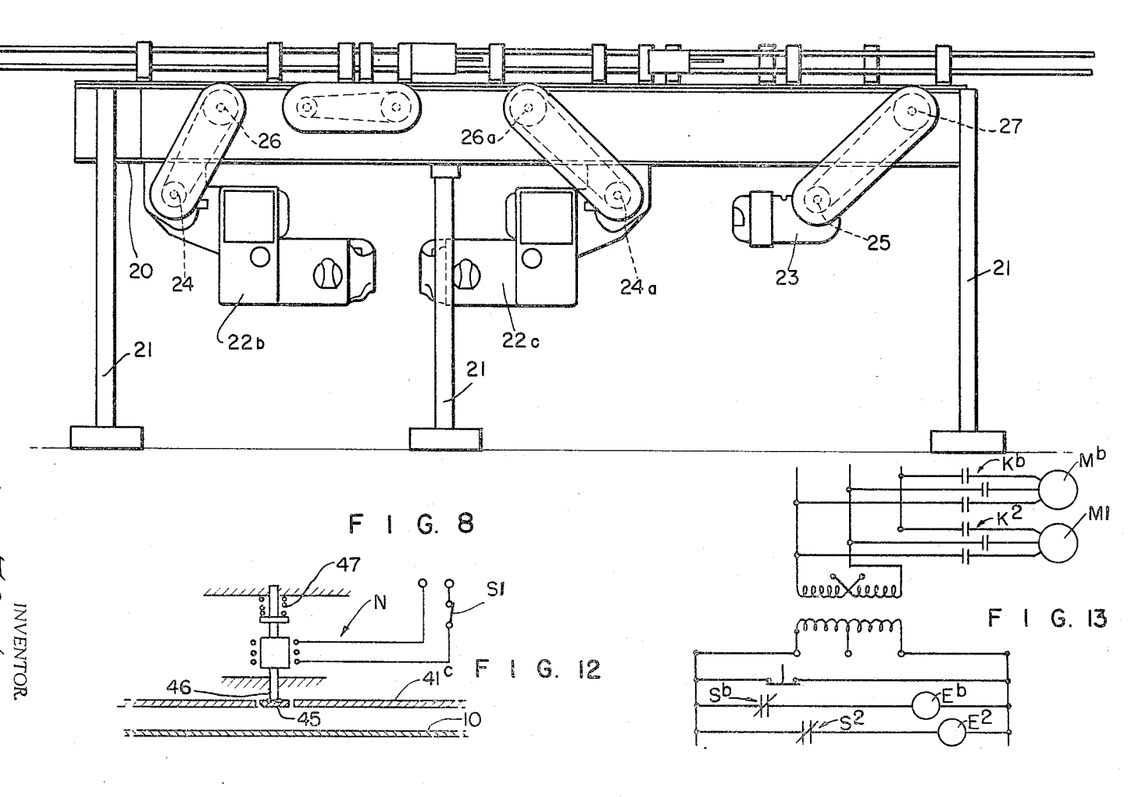
FIG. 8 is a diagrammatic side elevation of the apparatus of FIG. 7.
FIG. 12 is a diagrammatic plan view showing a portion of a single-row conveyor path provided with means, in accordance with the present invention, for automatically stopping the flow of articles along said path.
FIG. 13 is a diagram illustrating a simple electrical circuit such as may be employed in the practice of the invention.

It will be evident that if instead of a gate 45 for blocking the delivery passage, the switch $S^1$ is in the supply circuit of an individual motor for driving the conveyor 10, such inward motion of the detector finger will at once stop the conveyor 10 and thus again result in terminating the discharge of articles from the delivery end portion of the passage C.

Again, if a detector-actuated switch $Sb$ be arranged to control the circuit (FIG. 13) of the motor $Mb$ which drives the processing apparatus R, the starter coil $Eb$ of said motor will be de-energized by the movement of the detector finger to an abnormal inward position, due to the depletion of the articles in the converging passage C, and thus, in this way, the discharge of articles from the passage C is terminated.

Figure 3:
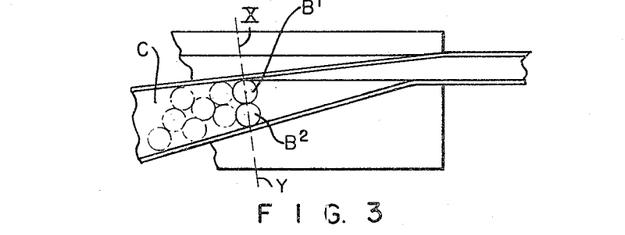
FIG. 3 is a diagrammatic, fragmentary plan view showing a converging passage such as is customary in combining apparatus of the general type, but to larger scale than FIG. 1, illustrating how two articles may become so relatively arranged in such a converging passage as to jam.
Figure 4:
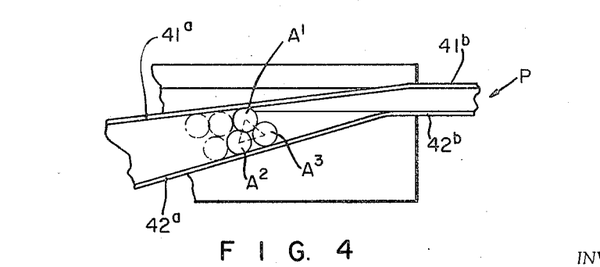
FIG. 4 is a view similar to FIG. 3, but illustrating the anti-jam or triangular article-pattern which it has been discovered avoids the fortuitous formation of such a relative arrangement of two articles as shown in FIG. 3.

As previously suggested, the operation of the apparatus of the present invention depends upon the recognition that the jamming of articles in a converging passage, like the passage C, such as occurs now-and-then in combining apparatus of this general type (although such occurrence may be infrequent), results from the fortuitous arrival of two articles, for example the bottles $B^1$ the $B^2$ (FIG. 3), at substantially the same instant at a point in the converging passage C such that a line X—Y joining the centers of the two articles is substantially perpendicular to one wall, at least, of the converging passage, with the peripheries of the articles touching each other and with the periphery of each respective article touching one of the walls of the passage. When thus disposed the articles wedge so that neither can advance and the result is a blocking of succeeding articles and termination of the delivery of articles to the processing apparatus. However, as above noted, it has been discovered that when circular articles move along such a converging passage, they normally automatically arrange themselves to form successive groups, each consisting of three articles $A^1$, $A^2$ and $A^3$, two of which ($A^2$ and $A^3$) contact one wall (42a) of the passage and the third ($A^1$) of which contacts the other wall (41a), with their centers so relatively located as to define the corners of an equilateral triangle (indicated in dotted lines). When such a condition prevails, the articles flow freely, the foremost article ($A^3$) at the base of such a triangle and which contacts one wall (42a) of the passage being free to advance thereby permitting the article ($A^1$), which forms the apex of the triangle, to advance, with the result that a new triangle forms, with its base contacting the opposite wall of the passage. The formation of these triangular arrangements, with their bases first at one side and then at the other of the passage, prevents two articles from arriving at the jam-forming position. However, this automatic arrangement of the articles in the converging passage may not continue if, for example, the supply of articles to the combining chamber should cease or diminish, substantially, while the processing apparatus continues to operate, for under such a condition, there may not be enough articles, approaching the narrower end of the passage to form such a triangular pattern, with the result that two articles may place themselves, as shown in FIG. 3, thus creating a jam.

By the present arrangement, wherein the detector device 48 controls a switch whose functioning determines whether or not articles may escape from the converging passage C, it is possible, when the triangular or anti-jam pattern has once been established in the converging passage C, to maintain said pattern indefinitely by so arranging the detector device that the feeler finger 49 will be kept in the depressed position only so long as the quantity of articles within the passage C is sufficient to insure the formation of the triangular pattern. In accordance with the present invention, as soon as the quantity of articles entering the combining chamber per unit of time so diminishes that the detector finger 49 is no longer depressed, the flow of articles out of the small end of the passage C is terminated, and thus the triangular or anti-jam pattern is not permitted to break down. Then, as soon as the normal flow of articles into the combining chamber is resumed, so that sufficient articles collect in the passage C to depress the detector finger, the delivery conveyor 10 begins to function in normal manner. Since the triangular or anti-jam pattern has been maintained, the normal flow of articles from the combining chamber into the delivery conveyor is resumed.

The conveyors F, D and B, comprised in the apparatus, are of the type customarily employed in devices of this kind, that is to say, each comprises an endless chain, the links of which carry smooth-surfaced steel plates upon which the bottles stand as they are moved along, but which permit relative slippage of the conveyor and bottle if by any means the advance of the bottle is interfered with. As above described, the conveyors B and F are driven continuously by the motor $M^2$ at the same speed and in the same direction. When the discharge of bottles from the passage C into the delivery path P is prevented, the conveyor F continues to operate and thus tends to continue to deliver articles into the combining chamber H by pushing them along the conveyor D. This might result in crowding bottles into the wider portion of the passage C in such a way as might interfere with the resumption of normal operation. To avoid this situation the conveyor D, which is driven by the motor $M^1$ (whose speed may be adjusted) is normally driven at a speed to constitute a metering device, such as to restrict the number of bottles which may enter the wide end of the passage C, to that which are required by the processing apparatus R. In order that the conveyor D may act as a retarding device to prevent the overcrowding of bottles in the passage C (when bottles are no longer discharging from the passage C) provision is made for stopping the conveyor D as soon as the number of bottles entering the passage C becomes excessive. For this purpose, a second detector device 58 (FIG. 1) is arranged on the wall of the combining chamber H, this detector device 58 including a switch $S^2$ (FIG. 13) which controls the supply of current to the starter coil $E^2$ for the motor $M^1$, and which is actuated by a feeler finger 59 which projects into the combining chamber H, but which is only depressed so as to open the switch $S^2$ when the number of articles within the combining chamber becomes excessive. When this occurs, the pressure of articles, acting on the detector finger 59, opens the switch and thus stops the motor $M^1$, so that now the conveyor D acts as a friction brake to prevent articles advanced by the conveyor F from entering the chamber H freely (while the switch $S^2$ is open), thus preventing the combining chamber and passage C from being completely filled so that bottles would be forced through the entire system and out onto the delivery conveyor 10. As soon as the conveyor D is free to accept more articles, the excess accumulation of bottles in the chamber H ceases and the apparatus resumes normal operation with the conveyor D running at normal speed.

Figure 5:
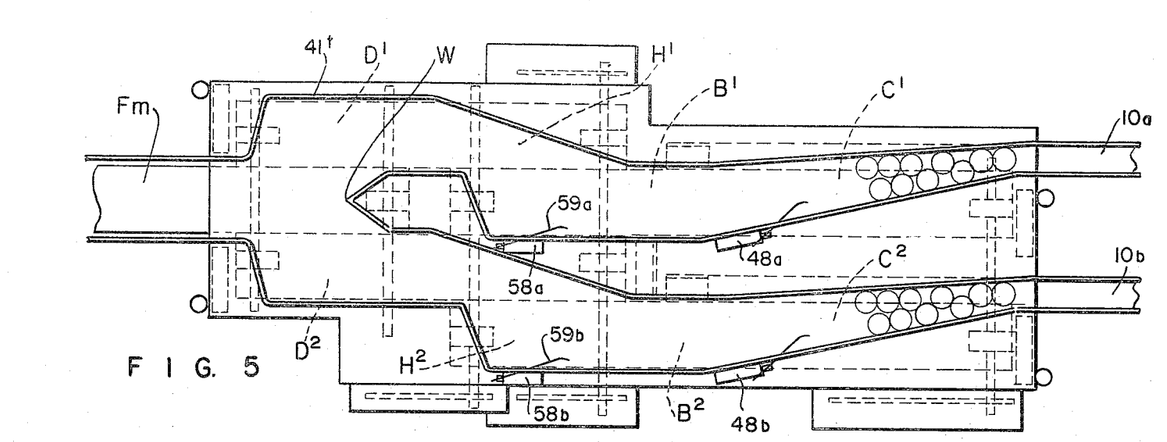
FIG. 5 is a diagrammatic plan view illustrating apparatus embodying the present invention, but in which articles received from the supply are first divided and then arranged to form two independent rows in each of which the articles are in tandem relation and which is intended to supply articles to two independendent processing machines.
Figure 6:
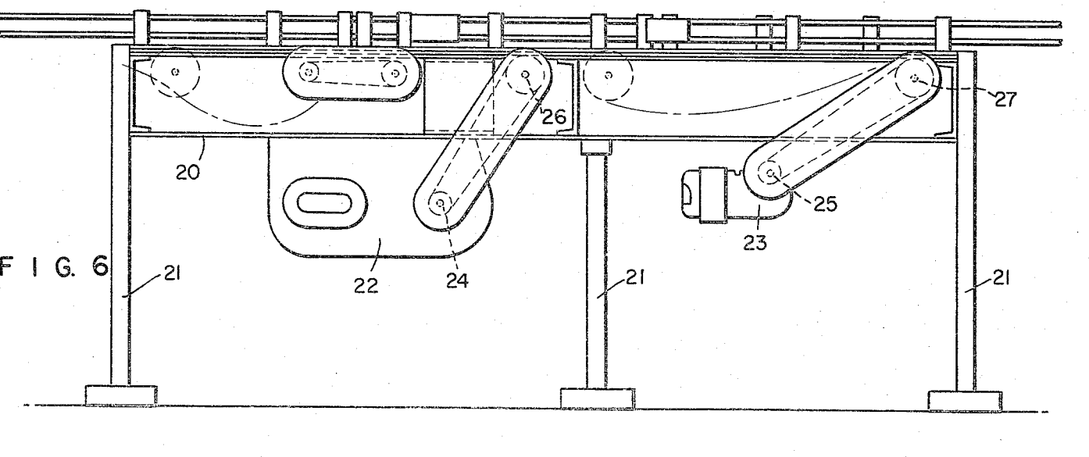
FIG. 6 is a diagrammatic side elevation of the apparatus of FIG. 5.

While the invention as heretofore described is illustrated as embodied in apparatus designed to combine articles to form a single row in which the articles are arranged in tandem relation for delivery to a single receiver, the invention is of broader utility, for example, when embodied in apparatus designed to receive articles in quantity from the source of supply, and after having first divided them to form a plurality of groups, to arrange the articles of each respective group to form a single row for delivery to independent receiving devices, the combining means, previously described, being duplicated in most respects, thereby to prevent the formation of a jam of articles as they are combined in forming either of these single-row arrangements. Thus, for example, as illustrated in FIGS. 5 and 6, the apparatus is shown as, in general, of the construction illustrated in FIGS. 1 and 2, comprising a single supply conveyor Fm on which articles advance, either in a plurality of parallel rows or in disorderly array, from the source of supply. However, in the apparatus of FIGS. 5 and 6, instead of a single conveyor like the conveyor D of FIG. 1, two conveyors $D^1$ and $D^2$ are provided, each similar to the single conveyor D of FIG. 1 and each driven by an independent motor in the same manner as the conveyor D of FIG. 1, but having associated therewith a divider W which operates to divert articles, advanced by conveyor Fm, into the space between the guard rails $41x$ and $41y$ into two groups, a portion of the articles thus diverted being delivered by the conveyor $D^1$ to the conveyor $B^1$, which corresponds in function and which is driven like the conveyor B of FIG. 1, while another portion of the articles received from the conveyor Fm is diverted from the conveyor $D^2$ onto the conveyor $B^2$ which is driven independently of the conveyor $B^1$ and which functions like the conveyor B of FIG. 1. In this apparatus converging guide walls define the passages $C^1$ and $C^2$ respectively, corresponding to the passage C of FIG. 1, within which the articles arrange themselves so that, at the delivery end of each passage, they form a single row for reception by the conveyors $10a$ and $10b$ respectively, which lead to independent receivers, for example independently driven processing machines.

For maintaining a preset triangular pattern of articles within the passages $C^1$ and $C^2$, each passage is provided with a detector device $48a$ and $48b$, respectively, comprising switches which function like the switch 48 of FIG. 1 to prevent depletion of articles within said passages $C^1$ and $C^2$ by terminating the flow of articles along the paths of the conveyors $10a$ or $10b$. The flow of articles may be stopped, for example, in one or another of the manners described with reference to the structure of FIG. 1. The apparatus of FIGS. 5 and 6 is also provided with detector devices $58a$ and $58b$, corresponding to the detector devise 58 of FIG. 1, having feeler arms $59a$ and $59b$, respectively, which respond to an excess accumulation of articles within the chambers $H^1$ and $H^2$ respectively, thereby to stop the motor or motors which drive the conveyors $D^1$ and $D^2$.

In this way, articles, received in quantity as supplied by the conveyor Fm, may be divided and so controlled that they are delivered in single file to each, respectively, of two independent receivers, in such a way that the occurrence of a jam is substantially prevented. Apparatus such as that of FIGS. 5 and 6 may employ, for example, conveyors $10a$ and $10b$, 3½ inches in width for supplying bottles to the infeed of each of two independent labeling machines and with the switches of detectors $48a$ and $48b$ in circuit with the individual motors which drive the supply conveyors $10a$ and $10b$ for the respective machines; or in circuit, for example, with the starter coils of the motors which drive the respective labeling machines. It will be noted that if one of such labeling machines be stopped for any reason, the operation of the other is not interfered with by the normal functioning of the apparatus as disclosed in FIGS. 5 and 6.

Figure 9:
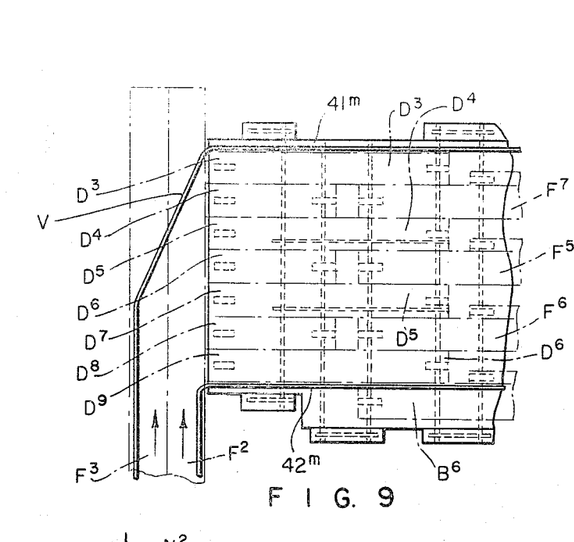
FIG. 9 is a fragmentary plan view showing conveyor apparatus for supplying articles to the device of FIG. 7.
Figure 10:
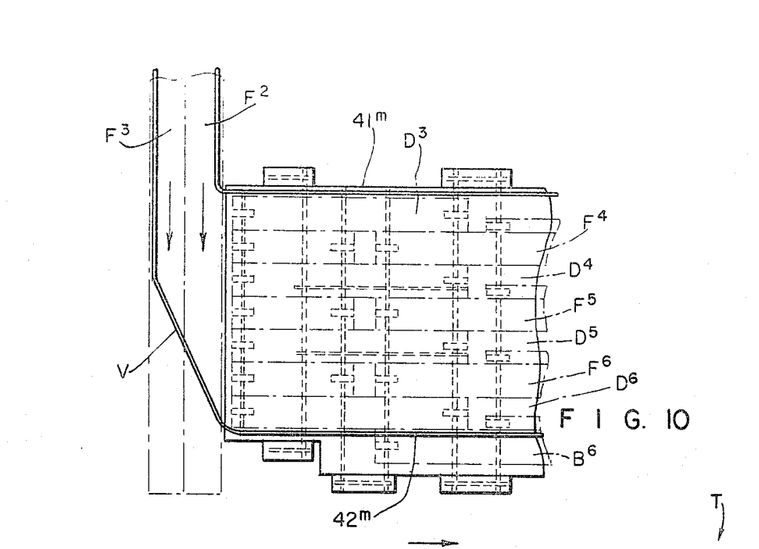
FIG. 10 is a similar view but showing a slightly different arrangement.

FIGS. 7 to 11 inclusive, illustrate a further utility of the invention as embodied in apparatus for supplying articles in single rows to each of four independent labeling machines. Thus, referring to FIG. 8, the apparatus in general resembles that shown in FIG. 2, comprising an elongate frame 20, supported by legs 21, having attached motor housings $22b$ and $22c$, each encasing a motor such as that contained in the housing 22 of FIG. 2, and a third housing 23 encasing a motor like that housed within the casing 23 of FIG. 2. As illustrated in FIG. 9 parallel supply conveyors $F^2$ and $F^3$ bring articles, arranged in definite rows or in no particular order, for delivery to a plurality of parallel metering conveyors $D^3$, $D^4$, $D^5$ and $D^6$, arranged, with interposed parallel transfer conveyors $F^4$, $F^5$ and $F^6$, between parallel guard walls $41m$ and $42m$, the conveyors $D^3$ to $D^6$ inclusive, being at right angles to the conveyors $F^2$ and $F^3$. In FIG. 10 a similar arrangement is shown except that the conveyors $F^2$ and $F^3$ move in a direction opposite to the supply conveyors shown in FIG. 9. Fixed deflector means V is operative to divert articles from the supply conveyors $F^2$, $F^3$ and distribute them among the conveyors $F^4$, $F^5$ and $F^6$.

Each of the conveyors $D^3$ to $D^6$ inclusive, is driven by a motor similar to the motor which drives the conveyor D of FIG. 1, each of these conveyors $D^3$ to $D^6$ inclusive, being driven by an independent motor.

Figure 11:
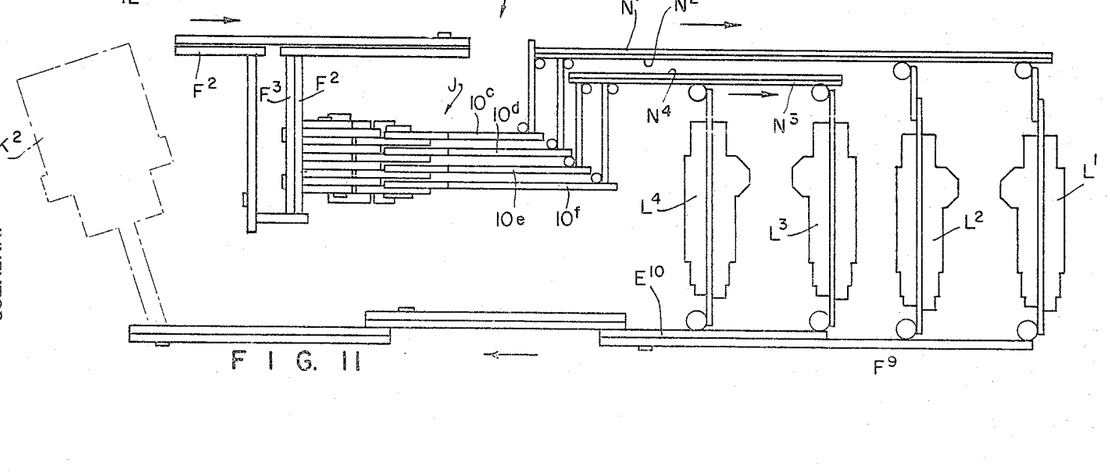
FIG. 11 is a smaller scale, diagrammatic plan view showing apparatus such as that of FIG. 7, and a conveyor system for deliverying articles to each of four labeling machines.

The articles which are delivered by the supply conveyors into the space between the walls $41m$ and $42m$ are advanced by the conveyors $D^3$ to $D^6$ inclusive, toward the dividers $W^1$, $W^2$ and $W^3$ which function to separate the articles into groups, one of which is diverted onto a conveyor $B^3$, another onto a conveyor $B^4$, a third onto a conveyor $B^5$ and a fourth onto a conveyor $B^6$, these conveyors $B^3$ to $B^6$ inclusive, being parallel and similar to the conveyor B of FIG. 1, all being driven by the same motor, this motor being of the constant speed type as described for driving the conveyor B. The conveyors $B^3$ to $B^6$ inclusive, deliver the articles into the converging passages $C^3$, $C^4$, $C^5$ and $C^6$ respectively, each similar to the passage C of FIG. 1, in each of which the articles arrange themselves to form a single row for delivery to the conveyors $10c$, $10d$, $10e$ and $10f$ respectively, the latter conveyors being arranged, as shown in FIG. 11, to deliver the articles to corresponding feed conveyors $N^1$, $N^2$, $N^3$ and $N^4$, leading to the independent labeling machines $L^1$, $L^2$, $L^3$ and $L^4$ respectively.

Each of the converging passages $C^3$, $C^4$, $C^5$ and $C^6$ is provided with its individual detector device $48c$, $48d$, $48e$ and $48f$ respectively, each including a switch which responds to a depletion of articles within the corresponding converging passage to stop the flow of articles along the corresponding delivery conveyors $10c$, $10d$, $10e$ and $10f$. Such stoppage of flow may be the result, as above suggested, of the actuation of a device within the single-row conveyor itself for blocking the flow; the stopping of an individual motor for driving the single-row conveyor involved; or the stopping of the motor of the individual labeling machine. In this arrangement also there is provided a detector device $58c$, $58d$, $58e$ and $58f$ respectively, which responds to an abnormal accumulation of articles on the corresponding conveyors $B^3$ to $B^6$ inclusive, thereby to stop the motor for driving the corresponding conveyors $B^3$ to $B^6$ inclusive. By way of specific example, each of the single-row conveyors $10c$, $10d$, $10e$ and $10f$ may be 3¼ inches wide and each driven by an independent motor under control of the corresponding detector device. The several conveyors $B^3$, $B^4$, $B^5$ and $B^6$ are driven by a single independent constant-speed motor, while each of the conveyors $D^3$, $D^4$, $D^5$ and $D^6$ which, like the conveyors $B^3$ to $B^6$ inclusive, may be 7½ inches wide, is driven by a separate, variable-speed motor. The conveyors $F^4$, $F^5$ and $F^6$ are desirably driven by power received from the drive chains for the conveyors $B^3$ to $B^6$ inclusive, and, as above described, the speed of the conveyors $D^3$, $D^4$, $D^5$ and $D^6$ is initially adjusted so that these conveyors act as metering conveyors designed to provide the corresponding labeling machine with approximately the number of articles per unit of time which the labeling machine can handle.

Figure 7:
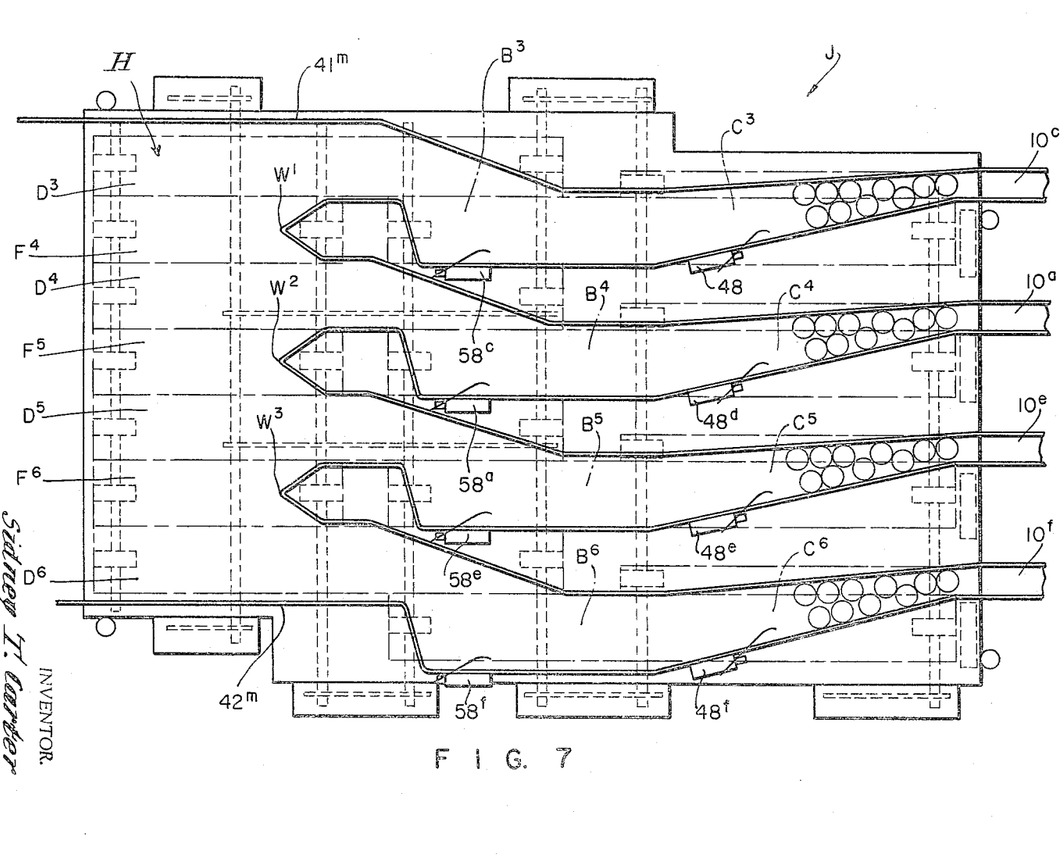
FIG. 7 is a diagrammatic plan view illustrating a further embodiment of the invention wherein articles from a supply are divided and delivered into four separate combining chambers from each of which articles are discharged to form a corresponding single row in which the articles are in tandem relation for delivery to four independent processing machines.

As illustrated in FIG. 7, the conveyors $F^2$ and $F^3$, shown in FIGS. 9 and 10, are omitted, it being obvious that articles may be supplied to the conveyors $F^4$, $F^5$ and $F^6$ in any desired manner or, for example, the conveyors $F^4$, $F^5$ and $F^6$ may themselves be extended to the left as viewed in FIG. 7 to receive articles from any suitable source in the same way as is shown with respect to the conveyor $Fm$ of FIG. 5.

The arrangement, as illustrated in FIG. 7 for example, wherein the supply of articles to a plurality of labeling machines is under the control of the single combining apparatus J, has the additional advantage that the large capacity space H or supply between the walls $41m$ and $42m$, into which the articles are first delivered, constitutes, in effect, an accumulator so that if one or another of the labeling machines be temporarily stopped, articles may accumulate in this space without necessitating a shutdown of the entire set of labeling machines, since, from this space, the articles are distributed by the conveyors $D^3$, $D^4$, $D^5$ and $D^6$ to which ever one of the conveyors $B^3$, $B^4$, $B^5$ and $B^6$ is capable of taking them.

While certain desirable utilities of the invention have herein been described and illustrated by way of example, it is to be understood that the invention is broadly inclusive of all such other embodiments of the invention as fall within the scope of the appended claims.

I claim:

1. That method of preventing a jam of discrete articles, each circular in transverse section and all of the same diameter which, after passing through a supply chamber where they are disposed in disorderly array, enter the wider end of a converging passage of fixed dimensions from whose narrower end the articles escape to form a single row upon a conveyor which delivers them to power-driven processing apparatus, said method comprising as steps: providing means defining such a converging passage having its wider end disposed to receive the advancing articles, first arranging three of said articles in the converging passage to form an antijam pattern where the centers of the three articles define the corners of an equilateral triangle with the peripheral surfaces of two of said articles tangent to one side boundary of the converging passage and the peripheral surface of the third article is tangent to each of the first-named articles and also to the opposite boundary of said passage, and thereafter maintaining intact the triangular arrangement of articles in the converging passage by controlling the rate at which the processing apparatus takes articles from the single row conveyor relatively to the rate at which the articles are delivered into the combining chamber.

2. In combination with a motor-driven processing device and a power-driven conveyor which constitutes the floor of a single row delivery path along which articles are advanced to the processing device, article combining apparatus of the kind wherein motor-driven conveyor means constitutes a floor of a width such that articles resting on said floor are free to move transversely while being advanced by said conveyor means, means defining a converging passage of fixed dimensions and having its wider end arranged to receive articles from the conveyor means and having its narrower end arranged to deliver articles received from the conveyor means to said single-row delivery path, the width of the converging passage, where it joins the delivery path, being such as to permit only one article at a time to pass, and wherein fixed rigid elements constitute the opposite walls of said converging passage, and wherein articles are advanced through the converging passage solely by said motor-driven conveyor means, means normally operative to deliver articles to said conveyor means at a substantially constant rate and in disorderly array, and means operative to maintain a predetermined antijamming pattern of articles in said converging passage, said means consisting of a detector sensitively responsive to variations in the quantity of articles in the converging passage, and means controlled by said detector operative to stop the flow of articles along said single row delivery path whenever the quantity of articles in the converging passage drops below a predetermined level.

3. The combination according to claim 2, wherein the detector is located near the wider end of the converging passage.

4. The combination according to claim 2, wherein the processing device is driven by an electric motor, and the detector comprises a feeler so arranged within the converging passage as to be held in a definite position by articles within said passage so long as the quantity of articles in said passage is normal, and a switch controlling the circuit of the electric motor which drives the processing device, said switch being actuatable by the detector to break the motor circuit and stop the processing device if the quantity of articles in the converging passage becomes insufficient to retain the detector feeler in said definite position.

5. The combination according to claim 3, wherein the detector device comprises a movable, switch-actuating feeler so arranged within the converging passage that, so long as articles are supplied to the converging passage in quantity sufficient to meet the demands of said processing device, the feeler is held in inoperative position by the pressure of articles within the passage, the detector device being such that when the feeler is relieved of pressure the detector device becomes operative to open the switch and stop the processing device, and thereby terminates discharge of articles from the converging passage.

6. The combination according to claim 2, and wherein articles are delivered to the supply chamber by a motor-driven supply conveyor, further characterized in having a detector-operated switch in the circuit of the motor which drives said last-named conveyor, and a detector which controls said switch and which is so arranged within the supply chamber that in response to the accumulation of an abnormal quantity of articles within said supply chamber it is actuated to open said switch and thereby stop the supply-conveyor driving motor.

7. In combination with a plurality of motor-driven processing devices, article-combining apparatus of the kind wherein motor-driven conveyor means constitutes the floor of a supply chamber of a width such that articles, supported by the conveyor means, are free to move transversely within said chamber while being advanced by said conveyor means, divider means operative to separate the articles, in leaving the supply chamber, into a plurality of groups corresponding in number to the number of processing devices, fixed walls defining converging passages for the reception of each respective group of articles, fixed walls defining a single row path operative to receive articles from the smaller end of each, respectively, of said converging passages and to direct said articles to a corresponding one of said processing devices, means operative to deliver articles into the supply chamber at a substantially constant rate and in disorderly array, and means operative to maintain a predetermined antijamming pattern of articles in each of the respective converging passages, said means consisting of a detector sensitively responsive to variations in the quantity of articles in each respective converging passage, and means controlled by each respective detector operative to stop the flow of articles along the corresponding single row path whenever the quantity of articles in the corresponding converging passage drops below a predetermined normal level, whereby each individual processing device continues to be supplied with articles regardless of the stopping of any other processing device.

8. The combination according to claim 7, wherein, of the parallel conveyors which constitute the floor of the supply chamber, every other one is a metering conveyor driven by an independent variable speed motor, at a predetermined speed such as normally to restrict the number of articles, delivered to the corresponding supply chamber, to that required by the corresponding processing device, while the intervening conveyors are driven by the same motor at the same speed, and an independent detector, associated with each supply chamber operative, in response to abnormal accumulation of articles in said supply chamber, to stop the corresponding metering conveyor thereby to cause said metering conveyor to act as a brake and so retard the flow of articles into the converging passage.

References Cited by the Examiner
UNITED STATES PATENTS

| | | | |
|---|---|---|---|
| 1,852,322 | 4/1932 | Loew | 198—32 |
| 1,916,255 | 7/1933 | Cabot | 198—37 X |
| 2,404,232 | 7/1946 | Hunter | 198—32 |
| 2,980,229 | 4/1961 | Carter | 198—31 |
| 3,117,665 | 1/1964 | Nekola et al. | 198—30 |
| 3,178,006 | 4/1965 | Nigrelli et al. | 198—32 |

EVON C. BLUNK, *Primary Examiner.*

R. J. HICKEY, *Assistant Examiner.*